United States Patent [19]

Joh et al.

[11] Patent Number: 4,942,907

[45] Date of Patent: Jul. 24, 1990

[54] INTAKE MANIFOLD

[76] Inventors: Günter Joh, Kapellenweg 14, D-6460 Gelnhausen; Wilhelm Sedimayr, An der Hammerhalde 15, D-7730 VS-Villingen, both of Fed. Rep. of Germany

[21] Appl. No.: 366,198

[22] Filed: Jun. 9, 1989

Related U.S. Application Data

[63] Continuation of Ser. No. 121,266, Nov. 16, 1987, abandoned.

[30] Foreign Application Priority Data

Nov. 15, 1986 [DE] Fed. Rep. of Germany ....... 3639219

[51] Int. Cl.[5] ............ F16L 9/16

[52] U.S. Cl. ............ 138/157; 138/158; 138/164; 277/DIG. 9; 181/207

[58] Field of Search ............ 138/109, 110, 99, 128, 138/156, 157, 151, 158, 162, 164, 166, 167, 170, 171; 277/DIG. 9; 181/196, 207, 256; 123/198 R

[56] References Cited

U.S. PATENT DOCUMENTS

| | | | |
|---|---|---|---|
| 627,681 | 6/1899 | Brooks | 138/158 |
| 798,486 | 8/1905 | Aylett | 138/157 |
| 1,168,909 | 1/1916 | Rook | 138/158 |
| 1,197,140 | 9/1916 | Mathews | 138/157 |
| 1,329,522 | 2/1920 | Griffin | 138/157 |
| 3,204,668 | 9/1965 | Emerson et al. | 138/162 X |
| 4,164,243 | 8/1979 | Cookson et al. | 138/164 |
| 4,325,414 | 4/1982 | Schaefer | 138/120 |

FOREIGN PATENT DOCUMENTS

| | | | |
|---|---|---|---|
| 895490 | 5/1962 | Canada | 138/158 |
| 0049997 | 6/1889 | Fed. Rep. of Germany | 138/158 |
| 175253 | 5/1905 | Fed. Rep. of Germany | 138/164 |
| 3456 | 4/1919 | Netherlands | 138/157 |

*Primary Examiner*—James E. Bryant, III

*Attorney, Agent, or Firm*—Peter K. Kontler

[57] ABSTRACT

An intake manifold wherein separately produced sections of metallic or plastic material have neighboring surfaces defining a chamber which is adjacent the cavity of the manifold and is filled with a vulcanized elastomeric material which is bonded to the neighboring surfaces by a coupling agent, such as silane. The elastomeric material can be silicon rubber, nitryl rubber or polyacrylate rubber. The neighboring surfaces of the sections can form a tongue-and-groove connection which is adjacent the cavity of the manifold and is also adjacent the elastomeric material.

12 Claims, 2 Drawing Sheets

3
6
10
5

3
13
7
9
9
8
8
5
11
10
12
6

4
3
2
1
II
III
III 3
5
10
8
7
8
6
7

INTAKE MANIFOLD

This application is a continuation of application Ser. No. 121,266, filed Nov. 16, 1987, now abandoned.

BACKGROUND OF THE INVENTION

The invention relates to hollow articles of the type wherein one or more internal spaces or cavities are surrounded by separately produced sections which are sealingly secured to each other. Examples of such hollow articles are intake manifolds of motor vehicles.

In accordance with a presently known proposal, intake manifolds are produced by casting in iron molds with sand cores. A drawback of such practice is that the manifolds are expensive in view of the need to destroy the cores. In addition, the internal surfaces of the thus obtained manifolds are not sufficiently smooth . to ensure turbulence-free inflow of air or another fluid so that it is necessary to resort to a secondary treatment which contributes to the cost of the manifolds.

It was also proposed to make sections of intake manifolds in reusable molds in die casting machines and to weld the sections to each other subsequent to setting of their material. This results in the making of manifolds with reasonably smooth internal surfaces; however, the welding operation contributes significantly to the cost of the ultimate product.

OBJECTS AND SUMMARY OF THE INVENTION

An object of the invention is to provide a hollow shaped article, such as an intake manifold, at a fraction of the cost of heretofore known articles.

Another object of the invention is to provide a novel and improved method of securing two or more sections to each other so that the sections jointly define one or more cavities for the flow of gaseous or other fluid, e.g., in the internal combustion engine of a motor vehicle.

A further object of the invention is to provide novel and improved means for bonding the sections of the hollow article to each other.

An additional object of the invention is to provide a simple but reliable and stable bond between the sections of an intake manifold or an equally or even more complex hollow article.

Still another object of the invention is to provide a hollow shaped article wherein the sections which define one or more cavities are configurated in a novel and improved way.

One feature of the invention resides in the provision of a hollow shaped article, particularly an article which is reasonably or highly complex. Typical examples of articles which can embody the present invention are intake manifolds which are used in internal combustion engines. In accordance with the invention, the improved hollow article comprises at least two complementary sections which define at least one internal space or cavity, and means for bonding the sections to each other. The bonding means comprises at least one sealing element containing or consisting of a vulcanized elastomeric material and being interposed between the sections adjacent the internal space, and a coupling agent (such as silane) which secures the sealing element to the sections. The neighboring surfaces of the sections can be profiled (e.g., at least one of these surfaces can be formed with a groove), and the bonding means is disposed between such surfaces; for example, the bonding means can have a substantially oval cross-sectional outline. The neighboring surfaces of the sections can define at least one chamber which is adjacent the internal space and receives the bonding means.

The neighboring surfaces of the sections can further define at least one tongue-and-groove connection between the internal space and the bonding means.

The material of the sealing element can be selected from the group consisting of silicon-, nitryl-, and polyacrylate rubber.

The sections can contain a metal; for example, they can be die cast of aluminum. Alternatively, the sections can be made of a plastic material which can be selected from the group consisting of thermosetting resins and reinforced (e.g., glass fiber reinforced) polyamides.

The space or spaces which is or are defined by the sections can include one or more channels, e.g., a discrete channel for each cylinder of a multi-cylinder internal combustion engine if the article is an intake manifold.

The coupling agent normally forms at least one layer between the elastomeric material and the surfaces of the sections.

Another feature of the invention resides in the provision of a method of making a complex or highly complex hollow shaped article, such as the intake manifold of an internal combustion engine. The method comprises the steps of separately producing a plurality of metallic or plastic sections and providing the sections with neighboring surfaces which define at least one cavity of the assembled article and also define at least one chamber, coating the neighboring surfaces of the sections with at least one layer of a coupling agent (e.g., silane), introducing into the at least one chamber a flowable elastomeric material (e.g., silicon rubber, nitryl rubber or polyacrylate rubber) which is bondable to the surfaces of the sections in response to heating of its material and of the coupling agent, heating the introduced elastomeric material and the coupling agent to vulcanize the elastomeric material to the coupling agent and to bond the coupling agent to the surfaces of the sections, and causing the elastomeric material and the coupling agent to set.

The method can further comprise the step of providing the neighboring surfaces of the sections with a tongue-and-groove connection which is adjacent the cavity and is also adjacent the chamber.

The novel features which are considered as characteristic of the invention are set forth in particular in the appended claims. The improved shaped article itself, however, both as to its construction and the mode of making the same, together with additional features and advantages thereof, will be best understood upon perusal of the following detailed description of certain specific embodiments with reference to the accompanying drawing.

DESCRIPTION OF THE PREFERRED EMBODIMENTS

Figure 3:
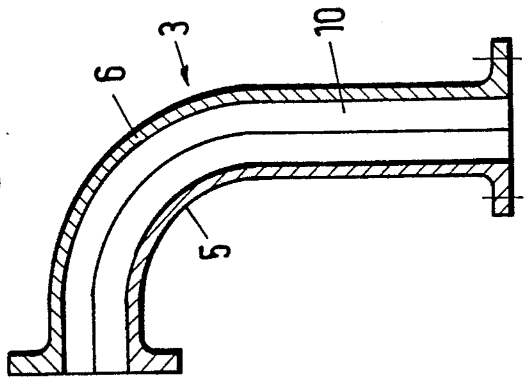
FIG. 3 is a sectional view as seen in the direction of arrows from the line III—III of FIG. 1.
Figure 4:
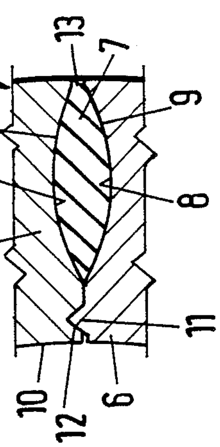
FIG. 4 is an enlarged view of a detail within the phantom-line circle in FIG. 2.
Figure 1:
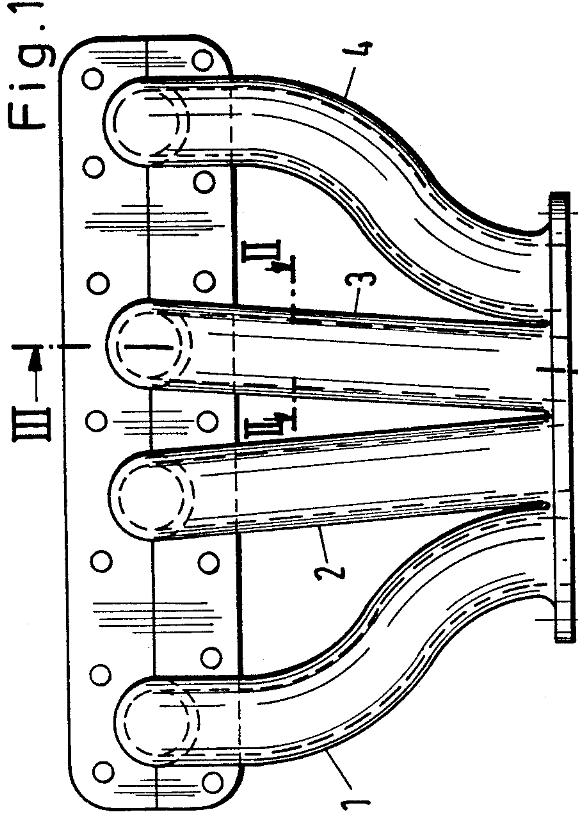
FIG. 1 is an elevational view of a hollow article whose sections are assembled in accordance with the invention and which constitutes an intake manifold suitable for use in the engine of a motor vehicle.
Figure 2:
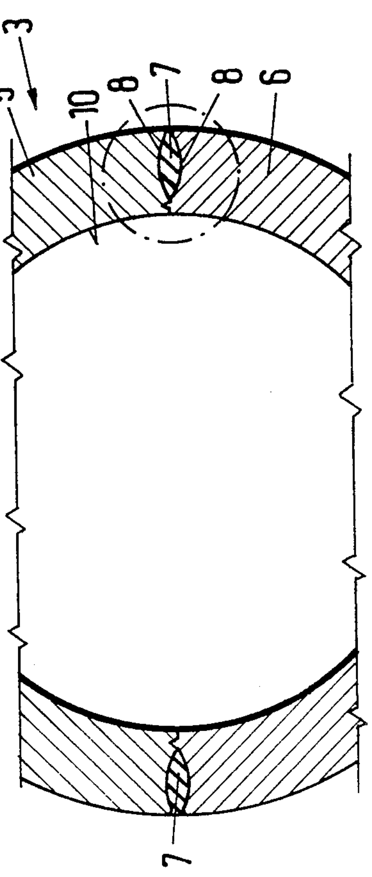
FIG. 2 is an enlarged fragmentary sectional view as seen in the direction of arrows from the line II—II of FIG. 1.

FIG. 1 shows, by way of example, a hollow shaped article which constitutes an intake manifold with four pipes 1 to 4. Each of the pipes has a rather complex curved shape and each such pipe is produced in accordance with a presently preferred embodiment of the invention. The details of the pipe 3 of the intake manifold of FIG. 1 are shown in FIGS. 2, 3 and 4. The construction of the pipes 1, 2 and 4 is or can be similar or identical to that of the pipe 3.

The pipe 3 comprises two complementary sections 5 and 6 which are preferably made of aluminum in a die casting machine and have neighboring profiled surfaces 8 defining a chamber for a bonding means which is used to sealingly secure the surfaces 8 to each other and to thus convert the sections 5, 6 into an elongated hollow shaped article in the form of pipe 3. The bonding means includes a vulcanized elastomeric sealing element 7 having a substantially oval cross-sectional outline and a layer of coupling agent 9 which bonds the external surface of the element 7 to the surfaces 8 of the sections 5 and 6. For example, the coupling agent 9 can consist of silane (also known as silicon hydride).

In the illustrated embodiment, each of the profiled surfaces 8 defines a relatively shallow groove bounded by a concave surface. The two grooves together form the aforementioned chamber for the coupling agent 9 and sealing element 7. In addition, the surfaces 8 include mating male and female portions 11, 12 which together form a tongue-and-groove joint adjacent the internal space or cavity 10 of the assembled pipe 3 and adjacent the bonding means including the element 7 and coupling agent 9. The male portion 11 of the joint is a rib or tooth having a substantially triangular cross-sectional outline, and the complementary female portion 12 has a recess or tooth space for the rib or tooth of the male portion 11. The purpose of the tongue-and-groove connection 11, 12 is to prevent the surplus of elastomeric material of the sealing element 7 from penetrating into the cavity 10 when the elastomeric material is introduced into the groove between the surfaces 8 and is still in a viscous state.

The method of making the pipe 3 is as follows:

The surfaces 8 of the prefabricated sections 5 and 6 of the pipe 3 are activated and the coupling agent is dissolved in a suitable solvent, such as xylene. The dissolved coupling agent is applied to the surfaces 8 in the form of a relatively thin layer and the solvent is caused or allowed to evaporate so that the remainder of the applied coating agent 9 forms a thin film of resinous material. The surfaces 8 of the sections 5 and 6 are then caused to confront each other in a manner as shown in FIGS. 2 and 4 so that they define the aforementioned chamber and the tooth-like male portion 11 of the joint extends into the recess of the female portion 12. At such time, the surfaces 8 jointly define at least one port 13 serving for introduction of flowable elastomeric material which is to form the sealing element 7 and is to be bonded to the surfaces 8 by the layers of coupling agent 9. If the material of the sealing element 7 is silicon rubber, the material is heated to a temperature of approximately 110° C. so that its viscosity is sufficiently pronounced to allow for injection into the chamber between the surfaces 8 by way of the port or ports 13. In the next step, the injected elastomeric material is heated to a temperature of approximately 250° C. This entails a polymerization of the elastomeric material and of the coupling agent so that, after cooling, one obtains a reliable and strong connection between the surfaces 8 by way of the sealing element 7. It has been found that such bonding means can stand pronounced separating and/or other stresses and, due to its elasticity, such bonding means can serve to effectively damp sound resonance vibrations in the cavity 10 between the sections 5 and 6. It was further discovered that the elastic bonding means including the sealing element 7 and the coupling agent 9 is much more capable of standing vibratory and/or similar stresses than a rigid (e.g., welded) connection between the sections 5 and 6.

Silicon rubber is but one of presently preferred elastomer materials which can be used to form the sealing element 7 of the improved bonding means. For example, the sealing element 7 can consist of or can contain nitryl rubber or polyacrylate rubber. Moreover, the coupling agent 9 can be selected with a view to ensure the establishment of a strong and reliable bond with the surfaces 8 of the sections 5, 6 as well as to establish an equally strong and reliable bond with the adjacent surfaces of the sealing element 7. To this end, the coupling agent can contain a first material which exhibits the required desirable properties as concerns its adherence to the surfaces 8, and a second material which can bond the first material to the material of the sealing element 7.

It is further within the purview of the invention to provide one of the sections 5, 6 with a concave surface corresponding to one of the illustrated surfaces 8, and to provide the other of these sections with a surface bounding one or more projections extending into the groove defined by the concave surface but with a certain amount of play so that the two surfaces define a chamber or two or more chambers for reception of vulcanizable elastomeric material which thereupon caused to set and to be bonded to the sections 5, 6 by way of the selected coupling agent or agents.

Figure 5:
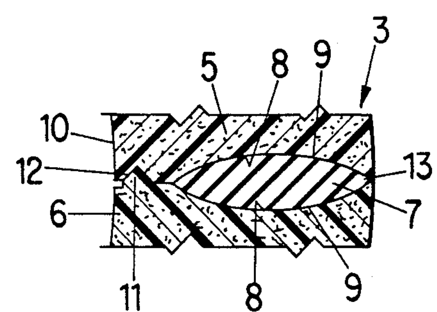
FIG. 5 is a view similar to that of FIG. 4 but showing the sections of a plastic article.

Still further, the sections 5 and 6 can be made of a suitable plastic material (FIG. 5), especially a heat-resistant thermosetting resin or a heat-resistant thermoplastic substance. For example, the sections can be made of polyamide which is reinforced by glass fibers. The composition of the coupling agent will be selected in dependency upon the characteristics of plastic material of the sections 5, 6 and also upon the characteristics of the material of the sealing element.

An important advantage of the improved method and hollow article is that the bonding means can be formed in mass-producing machines at a fraction of the cost of welding the sections to each other. Therefore, the improved method is especially suitable for the making of manifolds and/or other complex hollow shaped articles in production lines.

Another important advantage of the improved method and article is that the elastic bonding means is much more capable of taking up certain types of stresses (such as vibrations and/or other stray movements) than a rigid joint between the sections and to stand such stresses for long periods of time. As mentioned above, the improved bonding means is also capable of damping sound due to resonant vibratory movements in the cavity 10.

Profiling of one or both surfaces 8 is desirable but not absolutely necessary. An advantage of such profiling is that the area of contact between the bonding means and the sections 5, 6 is increased to thus further enhance the reliability and to prolong the useful life of the connection. The provision of a chamber which is bounded by two concave surfaces 8 or by a concave surface and a substantially flat surface is desirable in many instances because this allows for a more predictable introduction of flowable elastomeric material and for predictable distribution of introduced elastomeric material all the way along the cavity 10. Any known injection unit can be employed to introduce flowable elastomeric material between the surfaces 8 so as to fill the chamber and to thus ensure the establishment of a reliable bond between the sections 5 and 6.

The provision of the tongue-and-groove connection 11, 12 is desirable, especially if the hollow article is a portion of or an entire intake manifold, because such connection prevents the flow of surplus elastomeric material into the cavity 10 where it could interfere with the combustion of fuel in the combustion chamber or chambers of the engine, e.g., as a result of penetration of fragments of elastomeric material into the combustion chamber or chambers.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A pipe for an intake manifold for use in a combustion engine, said pipe having a curved longitudinal axis and comprising at least two complementary sections defining at least one internal space; and means for bonding said sections to each other to establish a connection between said sections, said bonding means consisting of at least one connecting element containing vulcanized elastomeric material and being interposed between said sections adjacent said internal space and a coupling agent securing the connecting element to said sections, and said bonding means constituting a means for damping sound responsive vibrations in the pipe between said sections.

2. The pipe of claim 1, wherein said sections have neighboring surfaces including at least one profiled surface and said bonding means is disposed between said surfaces.

3. The pipe of claim 2, wherein said surfaces define at least one chamber for said bonding means.

4. The pipe of claim 2, wherein said surfaces include portions defining a tongue and groove connection between said internal space and said bonding means.

5. The pipe of claim 1, wherein the coupling agent contains silane.

6. The pipe of claim 1, wherein the material of said connecting element is selected from the group consisting of silicon rubber, nitryl rubber and polyacrylate rubber.

7. The pipe of claim 1, wherein said sections contain a metal.

8. The pipe of claim 1, wherein said sections are die cast.

9. The pipe of claim 1, wherein said sections contain a plastic material.

10. The pipe of claim 9, wherein the plastic material is selected from the group consisting of thermosetting resins and reinforced polyamides.

11. The pipe of claim 1, wherein the bonding means has a substantially oval cross-sectional outline.

12. The pipe of claim 1, wherein the coupling agent forms a layer between the elastomeric material and the surfaces of said sections.

* * * * *

UNITED STATES PATENT AND TRADEMARK OFFICE
CERTIFICATE OF CORRECTION

PATENT NO. : 4,942,907

DATED : July 24, 1990

INVENTOR(S) : Günter JOH et al.

It is certified that error appears in the above-identified patent and that said Letters Patent is hereby corrected as shown below:

On the Title PAGE: "Sedimayr" should read --Sedlmayr--.
Col. 4, line 19, "mer" should read --meric--.
Col. 6, line 8, "responsive" should read --resonance--.

Signed and Sealed this

Seventeenth Day of March, 1992

*Attest:*

HARRY F. MANBECK, JR.

*Attesting Officer*

*Commissioner of Patents and Trademarks*